(12) United States Patent
Line et al.

(10) Patent No.: US 11,097,642 B2
(45) Date of Patent: Aug. 24, 2021

(54) VEHICLE SEATING ASSEMBLY LEG SUPPORT WITH BLADDER

(71) Applicant: Ford Global Technologies, LLC, Dearborn, MI (US)

(72) Inventors: Johnathan Andrew Line, Northville, MI (US); Spencer Robert Hoernke, Dundas (CA); Macit Aktas, Windsor (CA); Paul D. Peterson, Imlay City, MI (US); Jimmy Moua, Canton, MI (US); Joseph Michael Kish, Canton, MI (US); Sean Bayle West, Monroe, MI (US); Deeptej Kudav, Southgate, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 32 days.

(21) Appl. No.: 16/704,141

(22) Filed: Dec. 5, 2019

(65) Prior Publication Data

US 2021/0170931 A1   Jun. 10, 2021

(51) Int. Cl.
  *B60N 2/90*  (2018.01)
  *B60N 2/64*  (2006.01)
  *B60N 2/02*  (2006.01)

(52) U.S. Cl.
  CPC .......... *B60N 2/995* (2018.02); *B60N 2/0292* (2013.01); *B60N 2/64* (2013.01)

(58) Field of Classification Search
  CPC ........ B60N 2/995; B60N 2/0292; B60N 2/64; B60N 2/62; B64D 11/0643; A47C 7/50; A47C 7/506; A47C 7/5066; A47C 7/5062; A47C 7/5064

USPC .......................... 297/423.28, 423.26, 423.25
See application file for complete search history.

(56) References Cited

U.S. PATENT DOCUMENTS

| | | | | |
|---|---|---|---|---|
| 3,934,927 A | * | 1/1976 | Zur | A47C 1/0242 297/69 |
| 5,098,158 A | * | 3/1992 | Palarski | A47C 1/036 297/330 |
| 6,684,434 B2 | | 2/2004 | Ellis | |
| 10,093,200 B2 | | 10/2018 | Dry | |
| 2006/0006724 A1 | * | 1/2006 | Shimizu | A61H 7/004 297/423.26 |
| 2007/0021694 A1 | * | 1/2007 | Shiraishi | A61H 7/001 601/94 |
| 2010/0207443 A1 | | 8/2010 | Brncick | |
| 2013/0119733 A1 | * | 5/2013 | White | A47C 7/14 297/284.1 |
| 2014/0167465 A1 | * | 6/2014 | Sakata | B60N 2/0284 297/284.11 |

(Continued)

FOREIGN PATENT DOCUMENTS

WO   03074322 A1   9/2003

*Primary Examiner* — Mark R Wendell
(74) *Attorney, Agent, or Firm* — David Coppiellie; Price Heneveld LLP

(57) ABSTRACT

A vehicle seating assembly includes a leg support rotationally coupled to a seat and including a bladder assembly at least partially disposed on the leg support, and a lift mechanism disposed between the seat and the leg support, wherein the lift mechanism is configured to move the leg support between a stored position and a deployed position, and wherein the bladder assembly is inflatable between a deflated state and an inflated state.

16 Claims, 18 Drawing Sheets

(56) References Cited

U.S. PATENT DOCUMENTS

2018/0272904 A1* 9/2018 Line ........................ B60N 2/34
2020/0281359 A1* 9/2020 Fukunaga .............. A47C 7/142

* cited by examiner

VEHICLE SEATING ASSEMBLY LEG SUPPORT WITH BLADDER

FIELD OF THE DISCLOSURE

The present disclosure generally relates to a vehicle seating assembly. More specifically, the present disclosure relates to a vehicle seating assembly that includes a leg support and air bladders.

BACKGROUND OF THE DISCLOSURE

Vehicle seating assemblies may include leg supports that may be set in various positions to support passenger legs. Vehicle seating assemblies may also include inflatable bladders that may be set in various positions to support passenger legs. Leg supports and inflatable bladders may be adaptable to passenger preferences and body types.

SUMMARY OF THE DISCLOSURE

According to a first aspect of the present disclosure, a vehicle seating assembly is provided that includes a leg support rotationally coupled to a seat and including a bladder assembly at least partially disposed on the leg support. The vehicle seating assembly also includes a lift mechanism disposed between the seat and the leg support, wherein the lift mechanism is configured to move the leg support between a stored position and a deployed position, and wherein the bladder assembly is inflatable between a deflated state and an inflated state.

Embodiments of the first aspect of the disclosure can include any one or a combination of the following features:
- the lift mechanism includes a telescoping member;
- the leg support includes a first edge and a second edge, the first edge is rotationally coupled to the seat, and the second edge extends away from the seat;
- the seat includes a carrier and a seat pan, and the first edge of the leg support is rotatably coupled to the seat pan;
- the carrier includes a U-shaped member extending away from the seat;
- the leg support includes a recess for receiving a central portion of the U-shaped member when the leg support is in the stored position;
- the U-shaped member includes a first width, the leg support includes a second width, and the second width is greater than the first width;
- the lift mechanism includes a first base portion coupled to an underside of the seat and a second base portion coupled to an underside of the leg support;
- a telescoping member is disposed between the first base portion and the second base portion, wherein, in a retracted position, the telescoping member maintains the leg support in a stored position, and wherein, in an extended position, the telescoping member maintains the leg support in a deployed position;
- the telescoping member includes a pair of telescoping members;
- a bracket is disposed in the lift mechanism, wherein the bracket is rotatable about a pivot point between a rest position and an activated position to rotate the telescoping member from a position beneath the carrier to a position extending away from the carrier;
- the bladder assembly includes a first bladder subassembly disposed on the seat and a second bladder subassembly disposed on the leg support and each of the first bladder subassembly and the second bladder subassembly includes at least one bladder having an interior cavity, and the interior cavity is inflatable to inflate the bladder from a deflated position to an inflated position;
- the first bladder assembly includes a pair of bladders; and/or
- the second bladder assembly includes a plurality of bladders configured in a shingled arrangement.

According to a second aspect of the present disclosure, a vehicle seating assembly is provided that includes a deployable leg support positionable between a stored position, a deployed position, and intermittent positions therebetween and rotatably coupled to a seat. The vehicle seating assembly further includes a lift mechanism disposed between the seat and the deployable leg support. The vehicle seating assembly also includes a bladder including a plurality of bladders in a shingled arrangement disposed on the deployable leg support and selectively inflatable between a deflated state and an inflated state, wherein the vehicle seating assembly is positionable between a sitting position and a standing position while the deployable leg support is in the stored position.

Embodiments of the second aspect of the disclosure can include any one or a combination of the following features:
- in the stored position, the deployable leg support is angled inward under the seat and positionable against a carrier member of the seat, and in the deployed position, the leg support is angled outward and away from the seat; and/or
- a bladder is disposed in the seat proximate a coupling between the seat and the deployable leg support.

According to a third aspect of the present disclosure, a vehicle seating assembly includes a lift mechanism including a first portion that has a first platform securable to a seat frame, a second portion with a second platform securable to a leg support, and a pair of telescoping members extending between the first platform and the second platform and selectively positionable between a retracted position and an extended position corresponding to a respective stored position and a deployed position of the leg support, wherein the vehicle seating assembly is disposed on rails slidable within a track assembly, and wherein the vehicle seating assembly is rotatable about a pivot point disposed at the front of the vehicle seating assembly between a sitting position and a standing position.

Embodiments of the third aspect of the disclosure can include any one or a combination of the following features:
- the vehicle seating assembly in the sitting position includes a latch assembly fastened to a striker coupled to a slidable rail; and/or
- a bladder assembly disposed at least partially on the vehicle seating assembly.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Figure 1:
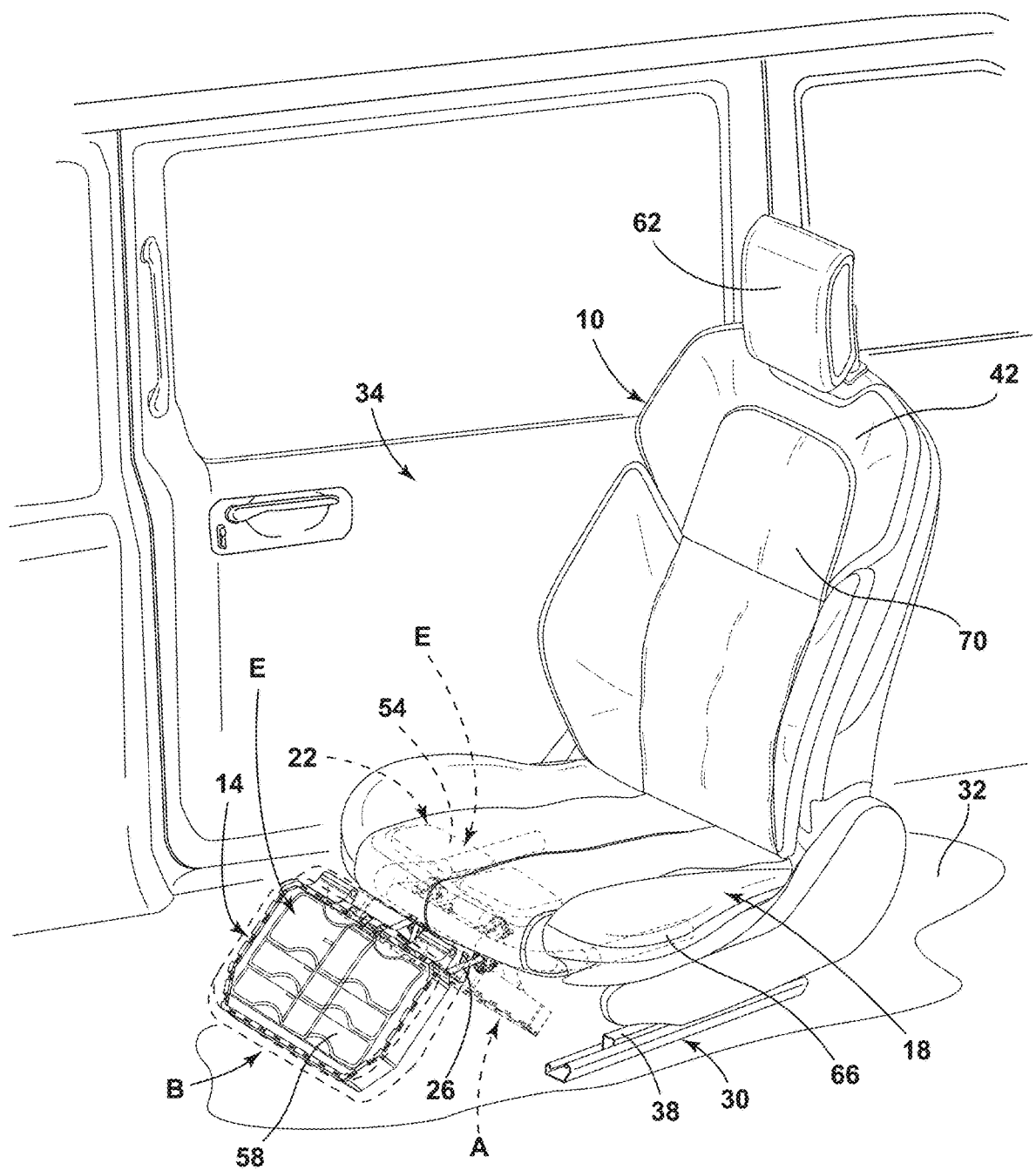
FIG. 1 is a perspective view of a vehicle seating assembly with a leg support in a deployed position and bladders in a deflated state.

With reference to the vehicle seating assembly 10 described below and shown in the attached figures, the vehicle seating assembly 10 may be described from the vantage point of a passenger sitting in the seating assembly 10. The side of a seating assembly 10 disposed on a right side of a seated passenger may be referred to as a right side of the seating assembly 10. The side of the seating assembly 10 disposed on the left side of a seated passenger may be referred to as the left side of the seating assembly 10.

Referring to FIGS. 1-24, a vehicle seating assembly 10 includes a leg support 14 rotationally coupled to a seat 18. The leg support 14 includes a bladder assembly 22 at least partially disposed on the leg support 14. A lift mechanism 26 is disposed between the seat 18 and the leg support 14. The lift mechanism 26 is configured to move the leg support 14 between a stored position A and a deployed position B. The bladder assembly 22 is inflatable between a deflated state E and an inflated state F.

Seating assembly features may contribute to a pleasant travel experience. Passengers may desire comfortable seating. A passenger may activate a leg support to elevate the lower legs of a passenger to a desired position. Thus, a passenger may achieve a restful seating posture. Additionally, a passenger may inflate bladders in the seat and the leg support to provide customized pillow-like support to the thighs and lower legs of the passenger. As such, passenger comfort may contribute to a rejuvenating travel experience.

Passengers may also desire convenient vehicle ingress and egress. A seating assembly may be disposed adjacent a vehicle door. The seating assembly may be conveniently movable from a sitting position to a standing position to allow a passenger space to access an adjacent row of seating. The seating assembly in the standing position may also be slidable along a track disposed in the vehicle floor to increase the available entry or egress space between the adjacent row of seating and the vehicle door. As such, a seating assembly may contribute to a pleasant travel experience by providing comfort features for passenger legs and adaptability for vehicle entry and egress.

Referring to FIGS. 1-6, a vehicle seating assembly 10 may include various features for providing movability of the vehicle seating assembly 10. The vehicle seating assembly 10 may include a track assembly 30 for translating the vehicle seating assembly 10 fore and aft within the vehicle 34. The track assembly 30 may be a long track assembly or a short track assembly for full or partial movement of the seating assembly 10 within the vehicle 34, respectively. The seat 18 may be secured to rails 38 that may slide in the track assembly 30. The track assembly 30 may be secured to a vehicle floor 32.

Figure 2:
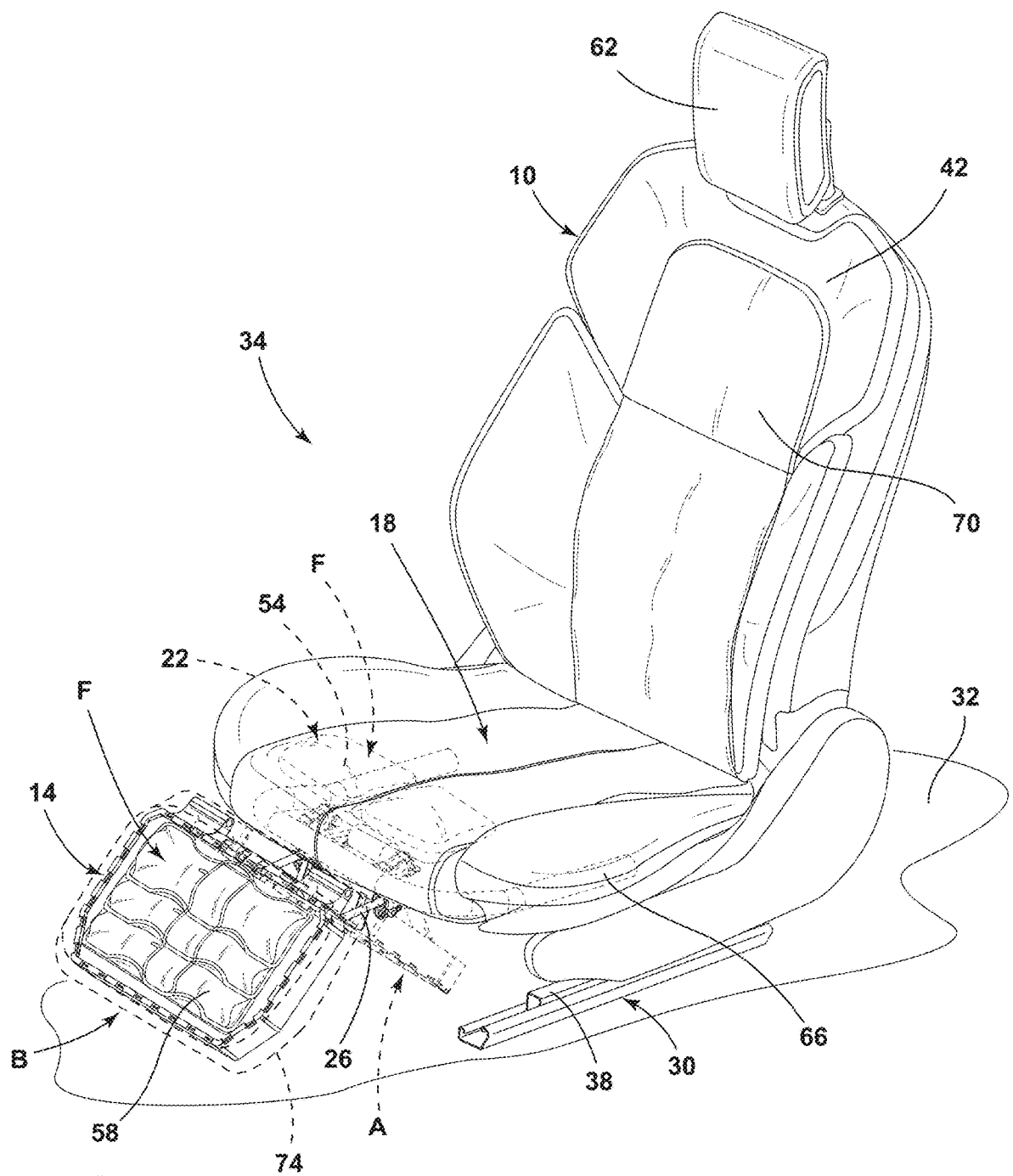
FIG. 2 is a perspective view of the vehicle seating assembly of FIG. 1 with a leg support in a deployed position and bladders in an inflated state.
Figure 3:
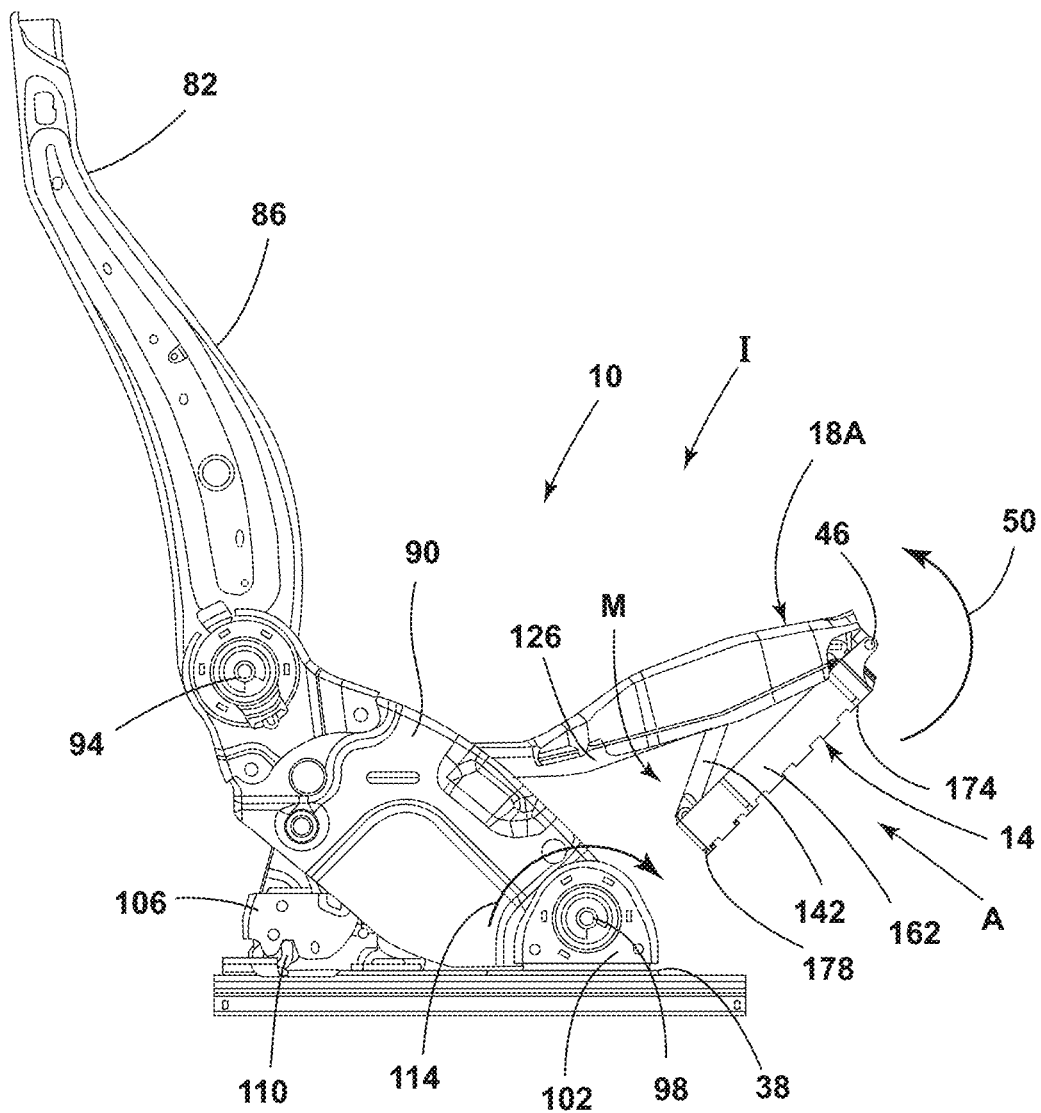
FIG. 3 is a right side view of a vehicle seating assembly with the leg support in a stored position and the seating assembly in a sitting position.

With continued reference to FIGS. 1-2, a seating assembly 10 is shown with a seat 18 and a seatback 42. A leg support 14 may be pivotably coupled to a front portion of the seat 18 at a pivot point 46. The leg support 14 may be movable between a stored position A and a deployed position B in the direction shown by arrow 50 (FIG. 3). A bladder assembly 22 may be disposed on the seat 18 and the leg support 14. The bladder assembly 22 may include a bladder subassembly 54 disposed on the seat 18 and a bladder subassembly 58 disposed on the leg support 14. Alternatively, the bladder subassembly 54 on the seat 18 and the bladder subassembly 58 on the leg support 14 may be part of an integral bladder assembly 22. The bladder assembly 22 is shown in the deflated state E in FIG. 1. The bladder assembly 22 is shown in the inflated state F in FIG. 2.

With continued reference to FIGS. 1-2, a headrest 62 may be slidably coupled to a seatback 42. The seat 18 may include a trim-covered seat cushion 66. The seatback 42 may include a trim-covered seatback cushion 70. A cover may be disposed over the leg support 14 and the bladder subassembly 58 disposed on the leg support 14.

Referring to FIGS. 3-6, a seating assembly frame 82 is shown. A seatback frame 86 may be pivotably coupled to B-brackets 90 disposed on opposing sides of the seating assembly 10. Each of the B-brackets 90 may include a pivotable coupling 94 for rotatably coupling the seatback frame 86 to the B-brackets 90. Each of the B-brackets 90 may include a pivotable coupling 98 for rotatably coupling the B-brackets 90 to mounts 102 disposed on the rails 38. The seating assembly 10 may include latch assemblies 106. The latch assemblies 106 may secure the vehicle seating assembly 10 to a striker 110 coupled to the rails 38. As such, it is contemplated that the latch assemblies 106 may be released to rotate the seating assembly 10 from a sitting position I (FIG. 3) to a standing position J (FIG. 3A) about the pivotable coupling 98 and in the direction shown by arrow 114.

With continued reference to FIGS. 3-6, a cross member 118 may be disposed between the B-brackets 90. The rear portion 122A of the seat pan 122 may be disposed over the cross member 118. A carrier 126 may extend away from the cross member 118. The carrier 126 may support the seat pan 122. The carrier 126 may be U-shaped, and the carrier 126 may include an upturned central portion 130 disposed proximate the front portion 18A of the seat 18. The upturned central portion 130 of the carrier may support the seat pan 122. The carrier 126 may be a U-shaped tube that may be attached to the seat frame 134 with brackets.

Referring to FIGS. 3-6, two telescoping members 142 may be activated to move the leg support 14 between a stored position A and a deployed position B. The telescoping members 142 may be in a retracted position M that may correspond to the stored position A of the leg support 14. The telescoping members 142 may be in an extended position N that may correspond to the deployed position B of the leg support 14.

Referring to FIGS. 1-2 and 23-24, a bladder assembly 22 may be disposed on the seat 18 and the leg support 14. The bladder assembly 22 may include a bladder subassembly 54 disposed on the seat 18 and a bladder subassembly 58 disposed on the leg support 14. The bladder subassemblies 54, 58 may be secured to a felt material 146 or other support that may be zip-tied or otherwise attached to the respective seat frame 134 and the leg support 14. In the example shown in FIG. 23, the bladder subassembly 54 disposed on the seat 18 includes a pair of bladder portions 290, 294. Each of the bladder portions 290, 294 may be positioned below a thigh of the passenger. In the example shown in FIG. 24, the bladder subassembly 58 disposed on the leg support 14 includes two bladder portions 314, 318 arranged in a shingled arrangement 322. Each row of three shingled bladders (314A, 314B, 314C and 318A, 318B, 318C) may be disposed below a leg of the passenger when the leg support 14 is in the deployed position B. As such, a passenger may regulate the support under each leg of the passenger.

With continued reference to FIGS. 3-6, the leg support 14 may include a frame 162. The frame 162 may provide a location for mounting the bladder subassembly 58. The bladder subassembly 58 may be disposed on a surface extending across the frame 162, partially within the frame 162, or completely within the frame 162 in the deflated state E. In one example, the bladder subassembly 58 disposed on the leg support 14 may protrude from the frame 162 in the inflated state F.

Referring again to FIGS. 3-6, the leg support 14 may include opposing lateral edges 174, 178. Lateral edge 174 may be rotationally coupled to the seat pan 122. Lateral edge 178 of the leg support 14 may extend away from the seat pan 122. Hinge elements 182 may extend from the lateral edge 174 of the leg support 14. The hinge elements 182 may be rotatably coupled to pins 186 that may extend from a front portion of the seat pan 122. An axis 190 may extend through the pins 186. A lift mechanism 26 for moving the leg support 14 between the stored position A and the deployed position B may be disposed between the leg support 14 and the seat 18. As such, FIGS. 3-6 show the attachment of the leg support 14 to the seating assembly frame 82. Additionally, FIGS. 3-6 show the bladder subassembly 54 disposed on the seat 18 and the bladder subassembly 58 disposed on the leg support 14.

Figure 3A:
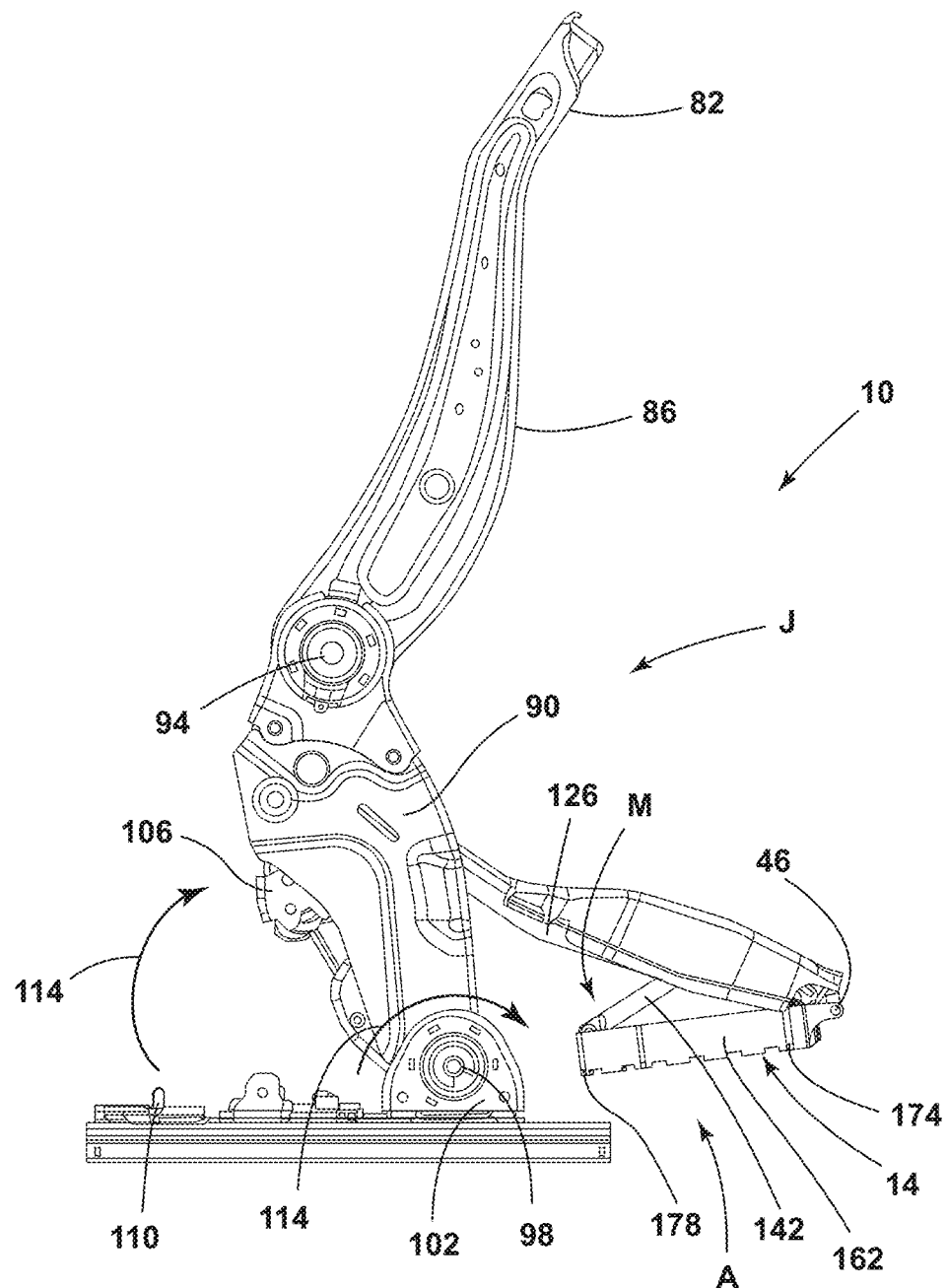
FIG. 3A is a right side view of the vehicle seating assembly of FIG. 3 with the leg support in a stored position and the seating assembly in a standing position.
Figure 4:
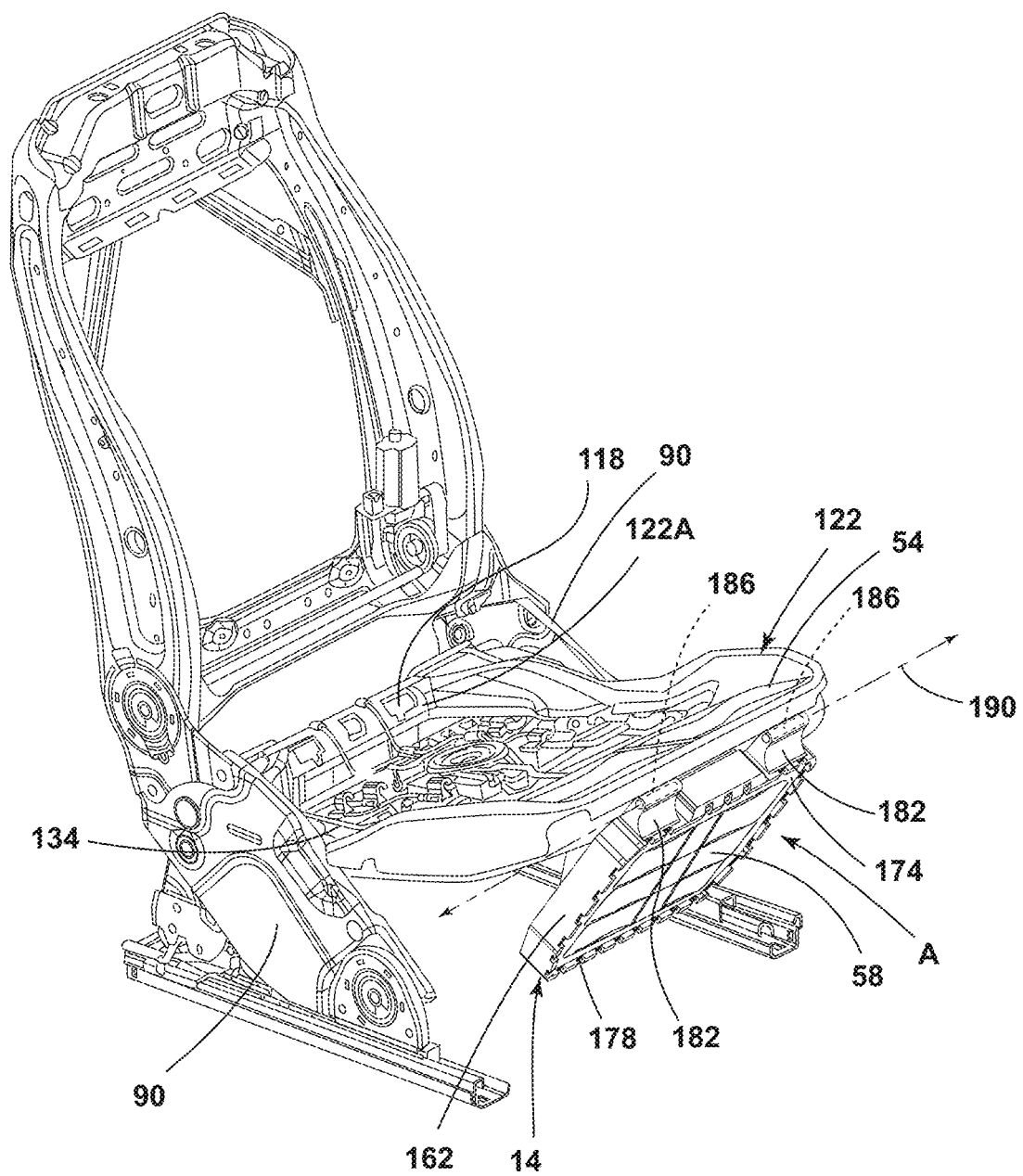
FIG. 4 is a right side perspective view of the vehicle seating assembly of FIG. 3.
Figure 5:
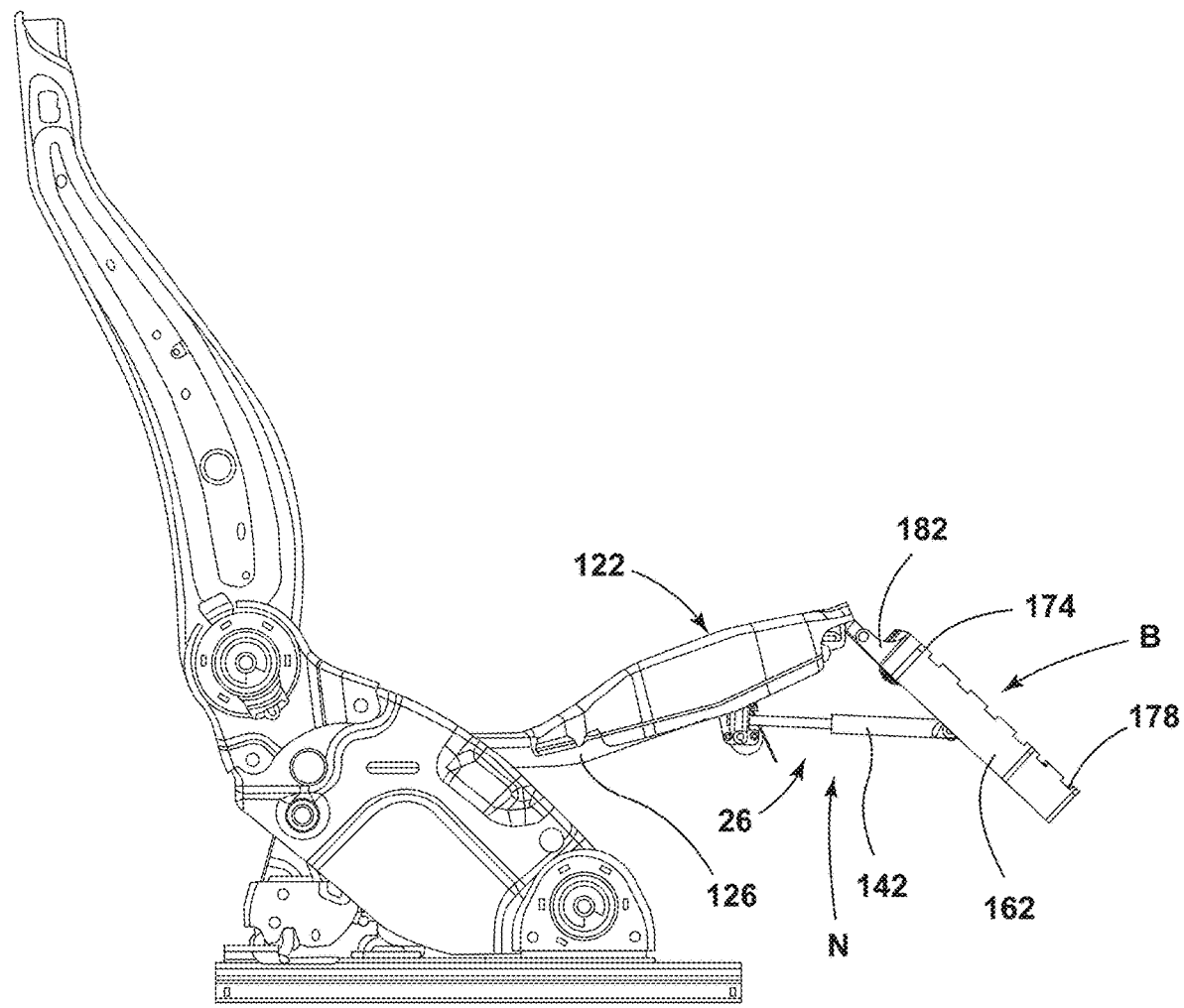
FIG. 5 is a right side view of a vehicle seating assembly with the leg support in a deployed position.
Figure 6:
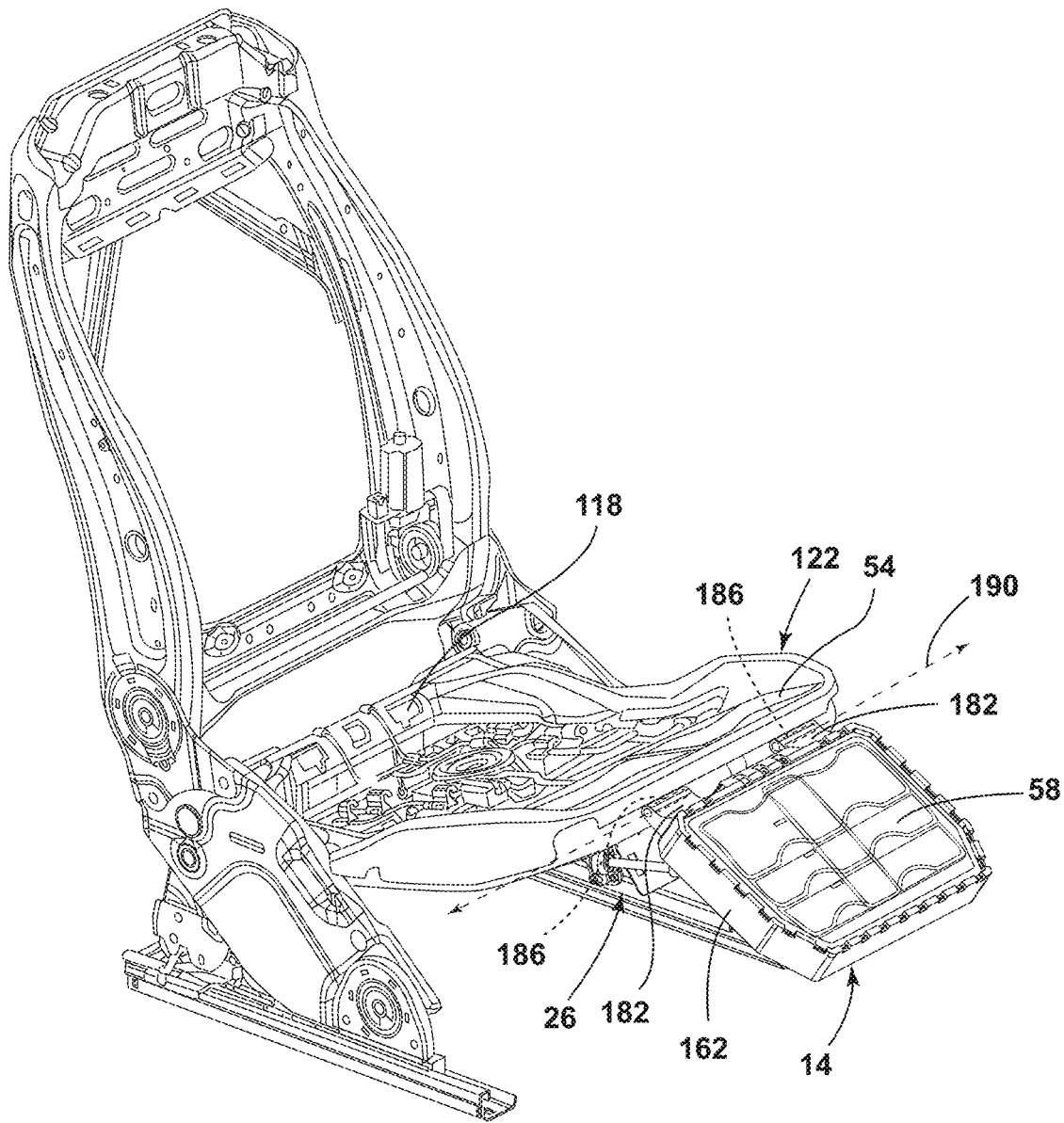
FIG. 6 is a right side perspective view of the vehicle seating assembly of FIG. 5.

Referring now to FIGS. 7-10, the leg support 14 is shown in relation to the carrier 126. The lift mechanism 26 is shown disposed between the carrier 126 and the leg support 14. As previously explained, the carrier 126 may be U-shaped. The carrier 126 may include legs 194 and a central portion 130. The central portion 130 may extend between the legs 194. The central portion 130 may be angled upward from the legs 194. The carrier 126 may be tubular. The leg support 14 may include a frame 162. The frame 162 of the leg support 14 may be defined by opposing lateral walls 198 and opposing longitudinal walls 202. The frame 162 may be further defined by connector walls 206 that may be disposed between each lateral wall 198 and each longitudinal wall 202. The leg support 14 may include a storage space 166 for receiving the lift mechanism 26. In the stored position A, the leg support 14 may be angled inward under the carrier 126 and positionable against the carrier 126. In the deployed position B, the leg support 14 may be angled outward from the seat 18 and away from the seat 18. As such, when the leg support 14 is in the stored position A, it may be positioned as close to the seat 18 as possible to provide storage space 166 beneath the seat 18 for storing passenger items, placing passenger legs, and other uses. Additionally, when the leg support 14 is in the stored position A, it may remain in the stored position A as the seating assembly 10 is rotated from the sitting position I (FIG. 3) to the standing position J (FIG. 3A).

Figure 7:
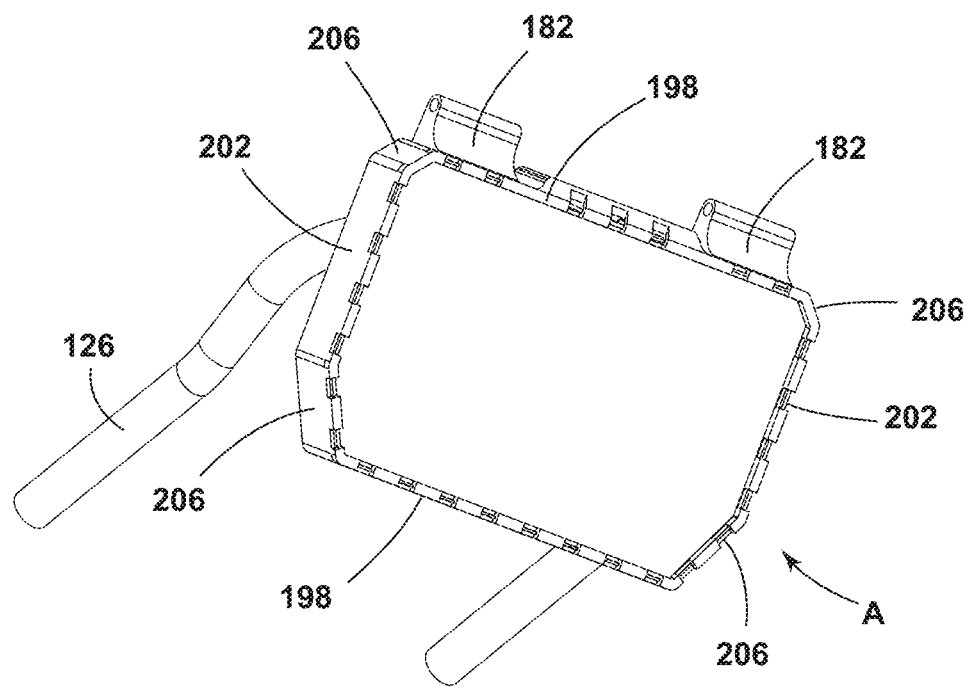
FIG. 7 is a right side perspective view of a portion of the leg support in a stored position.
Figure 8:
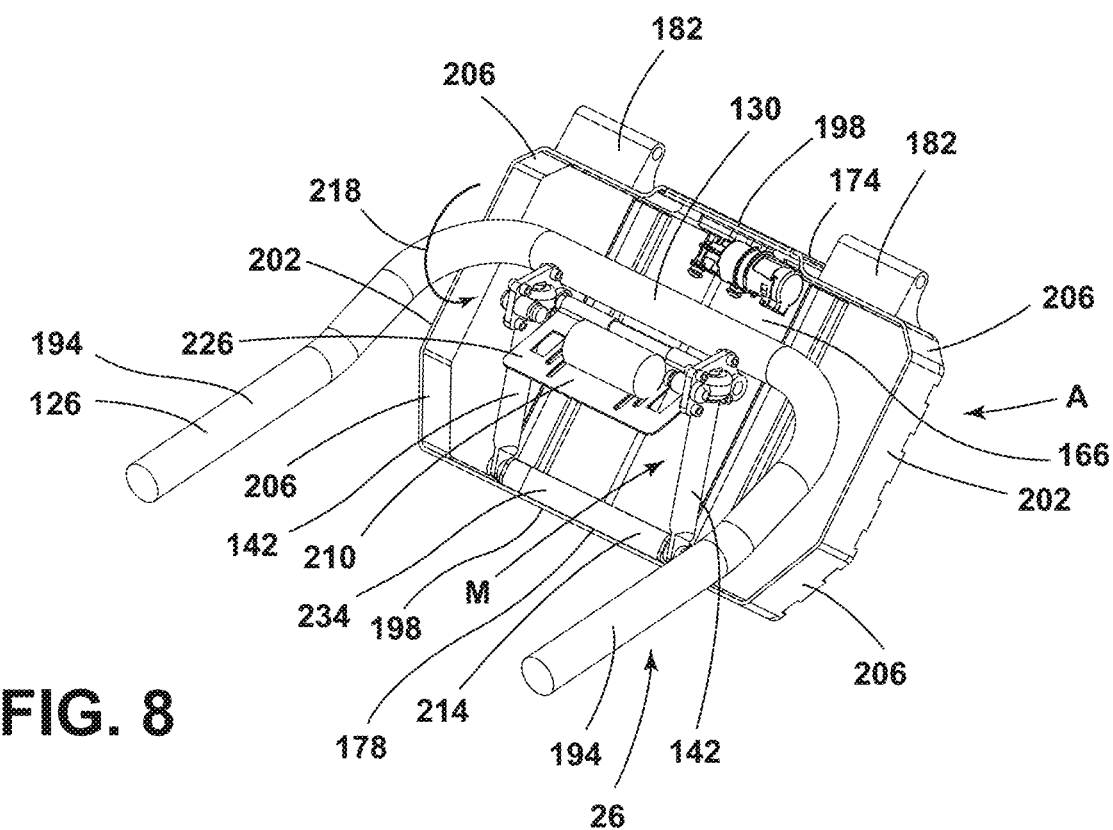
FIG. 8 is a right side back perspective view of the portion of the leg support of FIG. 7.
Figure 9:
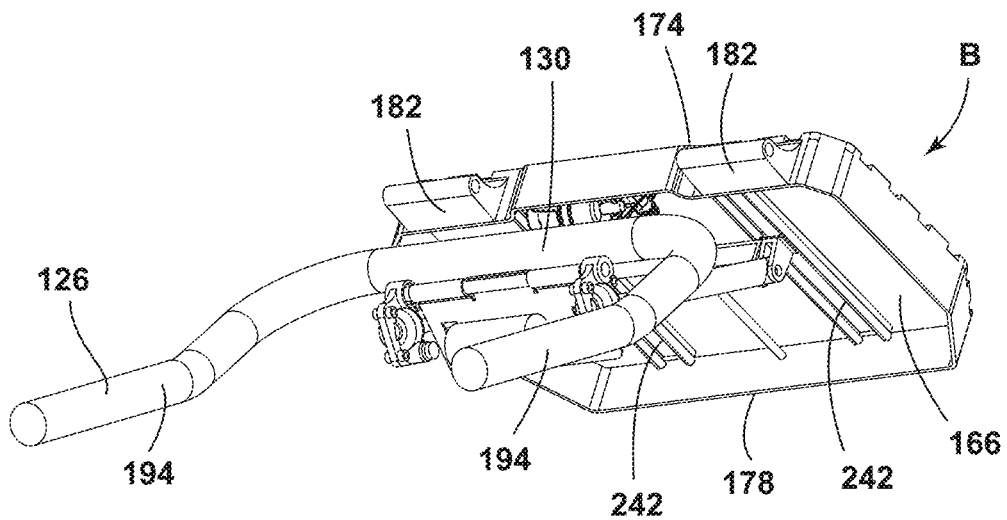
FIG. 9 is a right side back perspective view of a portion of the leg support in a deployed position.
Figure 10:
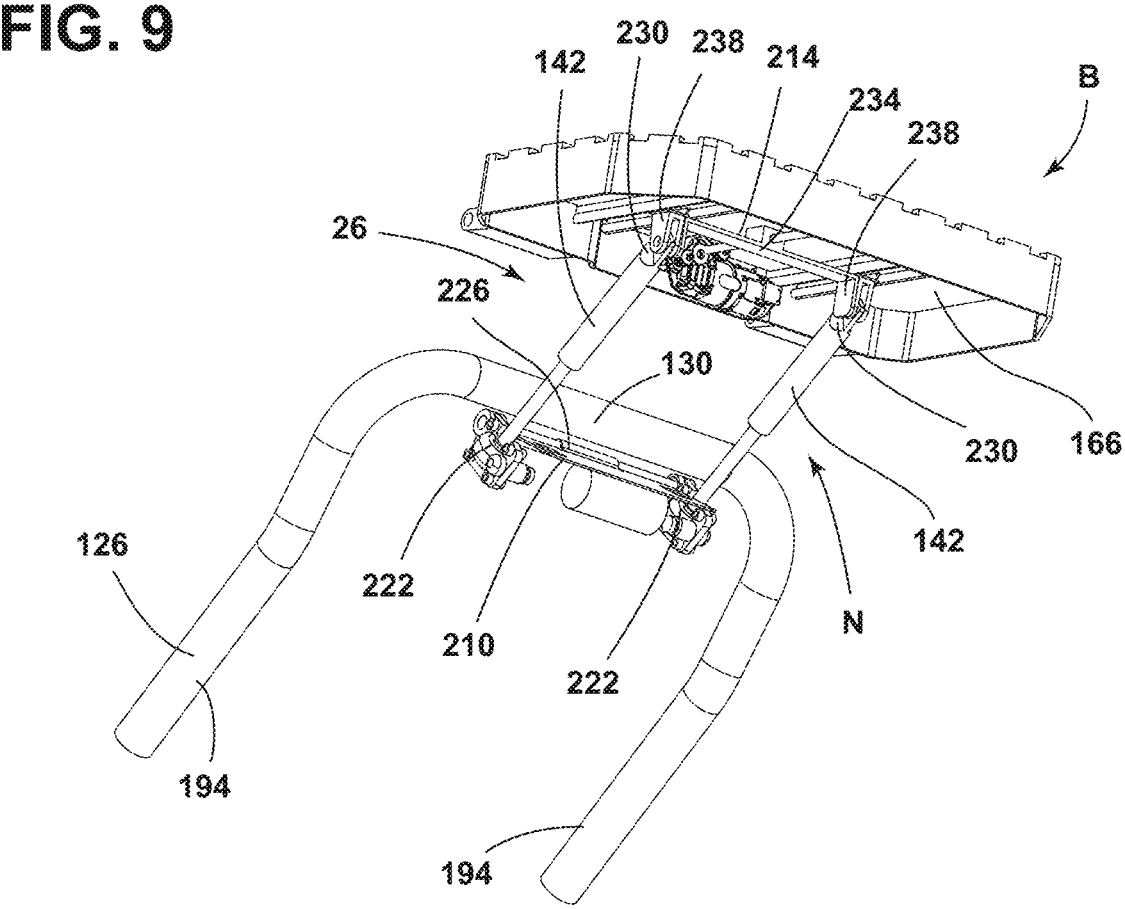
FIG. 10 is a right side perspective view of the portion of the leg support of FIG. 9.

With reference to FIGS. 7-8, the leg support 14 is shown in the stored position A, and the telescoping members 142 are shown in a corresponding retracted position M. Referring to FIGS. 9-10, the leg support 14 is shown in the deployed position B, and the telescoping members 142 are shown in a corresponding extended position N.

With reference to FIGS. 8-10, the lift mechanism 26 may include a base portion 210 coupled to an underside of the seat 18. The lift mechanism 26 may include a base portion 214 coupled to an underside of the leg support 14. Telescoping members 142 may be disposed between the base portion 210 coupled to the underside of the seat 18 and the base portion 214 coupled to the underside of the leg support 14. The telescoping members 142 may be coupled to the base portion 210 and may extend to the base portion 214. As the leg support 14 moves from the stored position A towards the deployed position B, the base portion 210 rotates around the central portion 130 of the carrier 126 in the direction shown by arrow 218. Each telescoping member 142 may have a first end 222 and a second end 230. The first end 222 of the telescoping member 142 may be attached to the first platform 226. The second end 230 of the telescoping member 142 may be attached to the second platform 234. The second end 230 of the telescoping member 142 may be rotatably coupled to a bracket 238 extending away from the base portion 214 on the underside of the leg support 14. Two elongated channels 242 may be disposed in the underside of the leg support 14. When the telescoping members 142 are in the retracted position M, then the bracket 238 that receives the telescoping member 142 is slidably disposed in the elongated channels 242 and adjacent to the lateral edge 178 of the leg support 14. As the telescoping member 142 moves from the retracted position M to the extended position N, the bracket 238 that retains the second end 230 of the telescoping member 142 may move along the elongated channel 242 from the lateral edge 178 of the leg support 14 toward the lateral edge 174 of the leg support 14. It is to be understood that the leg support 14 may be moved between the stored position A, the deployed position B, and intermittent positions therebetween by powered actuation. A passenger may push a button to move the leg support 14 to a position chosen by the passenger. As such, the lift mechanism 26 may include various parts for moving the leg support 14 from the stored position A to the deployed position B.

Figure 11:
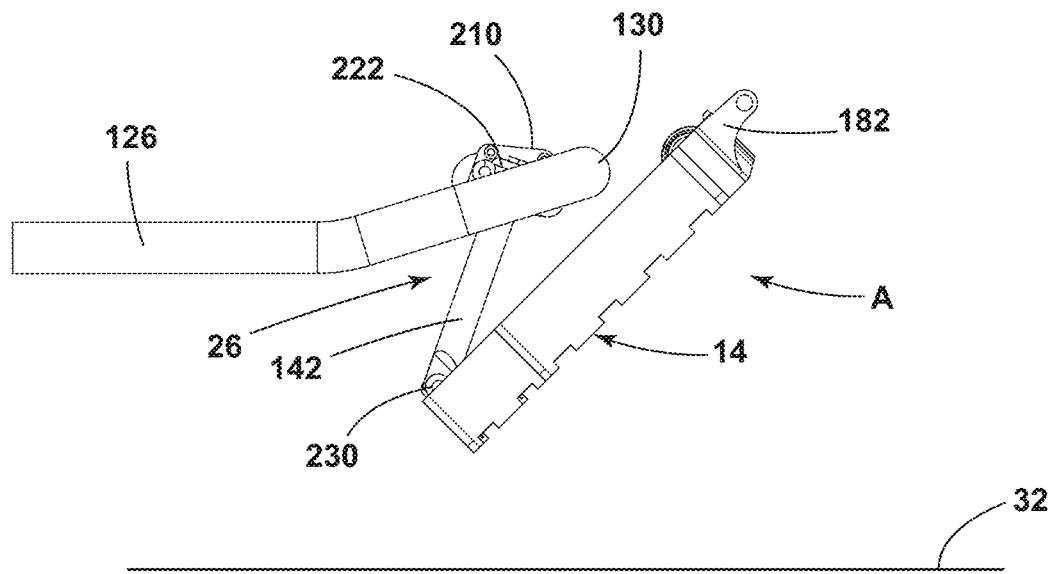
FIG. 11 is a right side view of a portion of the leg support in the stored position.
Figure 12:
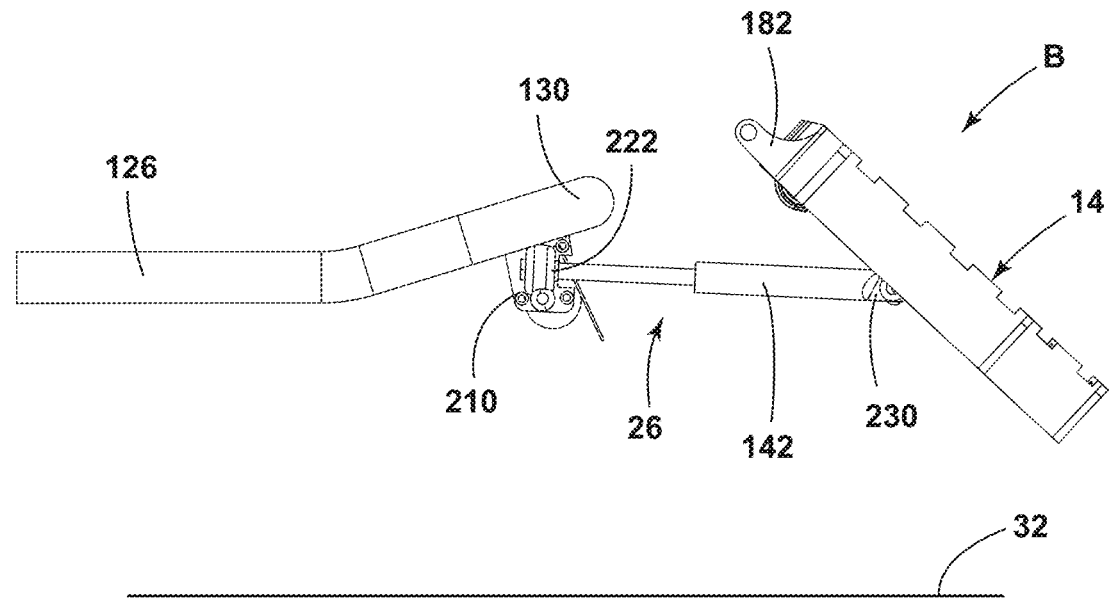
FIG. 12 is a right side view of the portion of the leg support of FIG. 11 in the deployed position.

Referring now to FIGS. 11-12, side views of the carrier 126, the lift mechanism 26, and the leg support 14 are shown. FIG. 11 shows the leg support 14 in the stored position A. FIG. 12 shows the leg support 14 in the deployed position B. With reference to FIG. 11, the base portion 210 is shown positioned along the carrier 126 when the leg support 14 is in the stored position A. With reference to FIG. 12, the base portion 210 is shown extending away from the carrier 126 when the leg support 14 is in the deployed position B. Additionally, when the leg support 14 is in the stored position A (FIG. 11), the second end 230 of the telescoping member 142 is directed toward the vehicle floor 32 and toward the latch assemblies 106 of the vehicle seating assembly 10. When the leg support 14 is in the deployed position B (FIG. 12), the second end 230 of the telescoping member 142 extends outward from the first end 222 of the telescoping member 142 in a direction substantially parallel to the vehicle floor 32.

Figure 13:
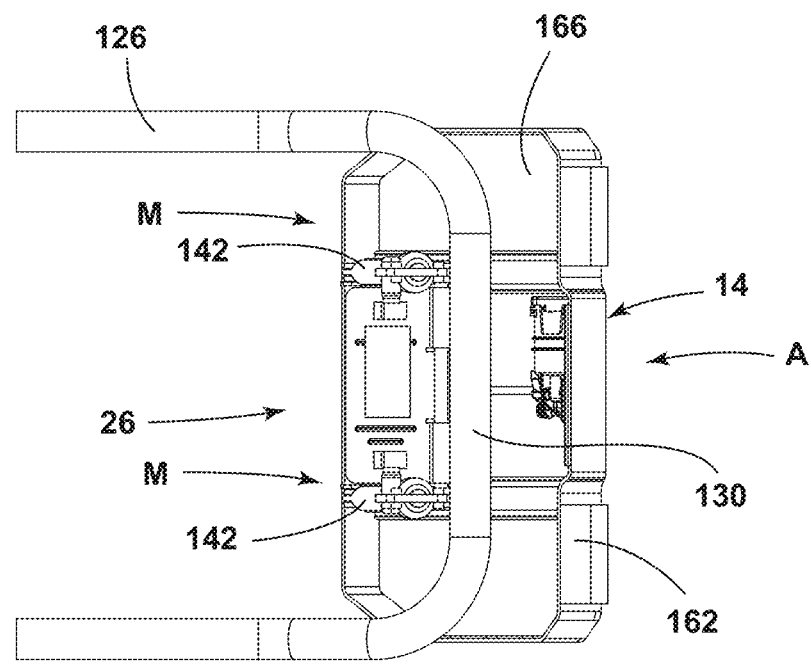
FIG. 13 is a top view of a portion of the leg support in a stored position.

With reference to FIG. 13, a top view of the carrier 126 and the leg support 14 in the stored position A is shown. The leg support 14 includes the frame 162. The carrier 126 is nested in the storage space 166 in the leg support 14. The telescoping members 142 are shown in the retracted position M that corresponds to the stored position A of the leg support 14.

Figure 14:
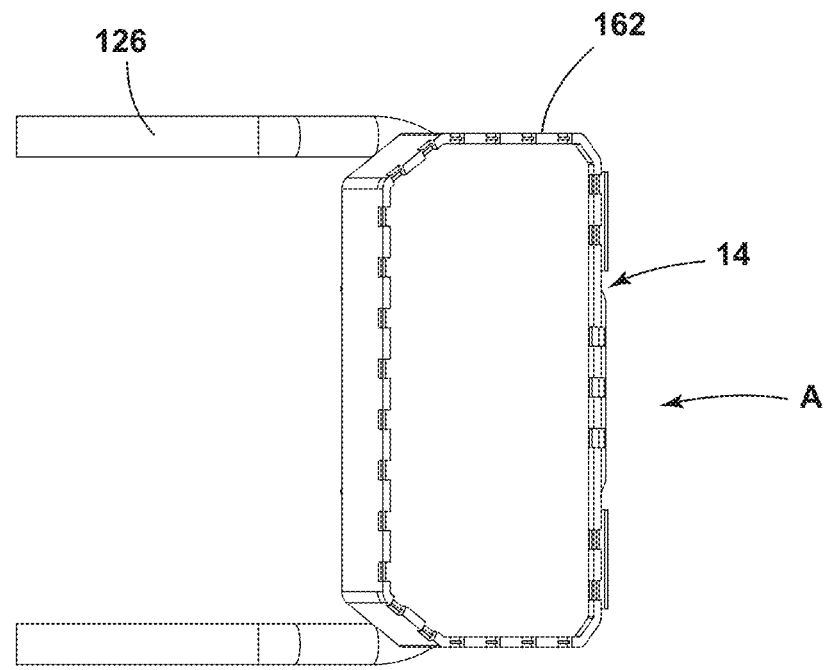
FIG. 14 is a bottom view of the portion of the leg support in a stored position of FIG. 13.

Referring to FIG. 14, a bottom view of the carrier 126 and the leg support 14 in the stored position A is shown. The leg support 14 includes the frame 162.

Figure 15:
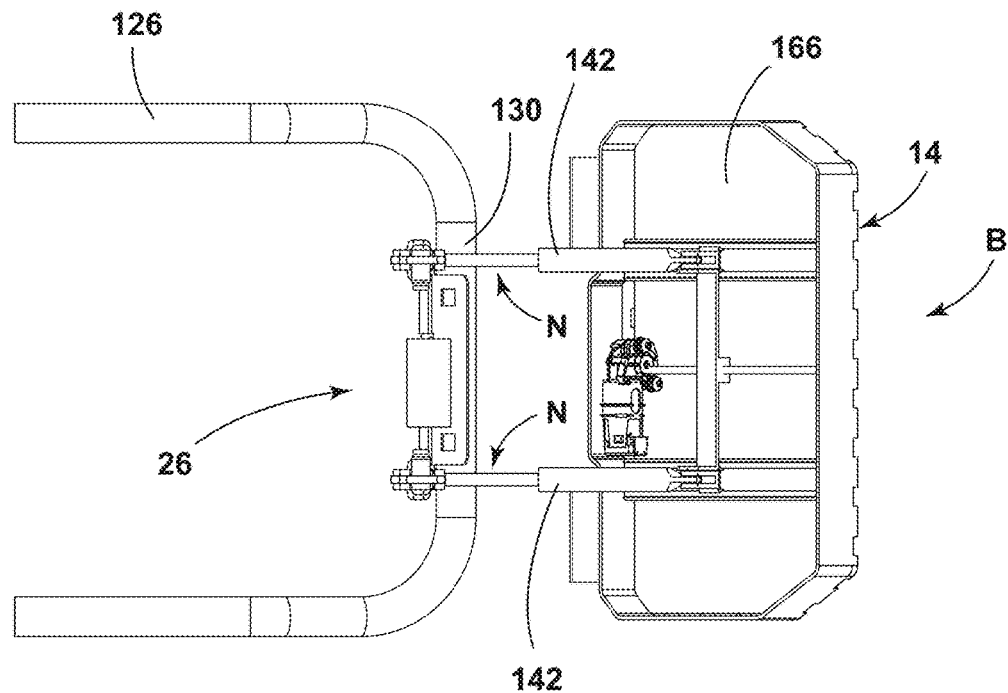
FIG. 15 is a bottom view of a portion of the leg support in a deployed position.

Referring to FIG. 15, a bottom view of the leg support 14 in the deployed position B is shown. The telescoping members 142 are shown in the extended position N to correspond to the leg support 14 in the deployed position B. The lift mechanism 26 is shown extending between the carrier 126 and the leg support 14.

Figure 16:
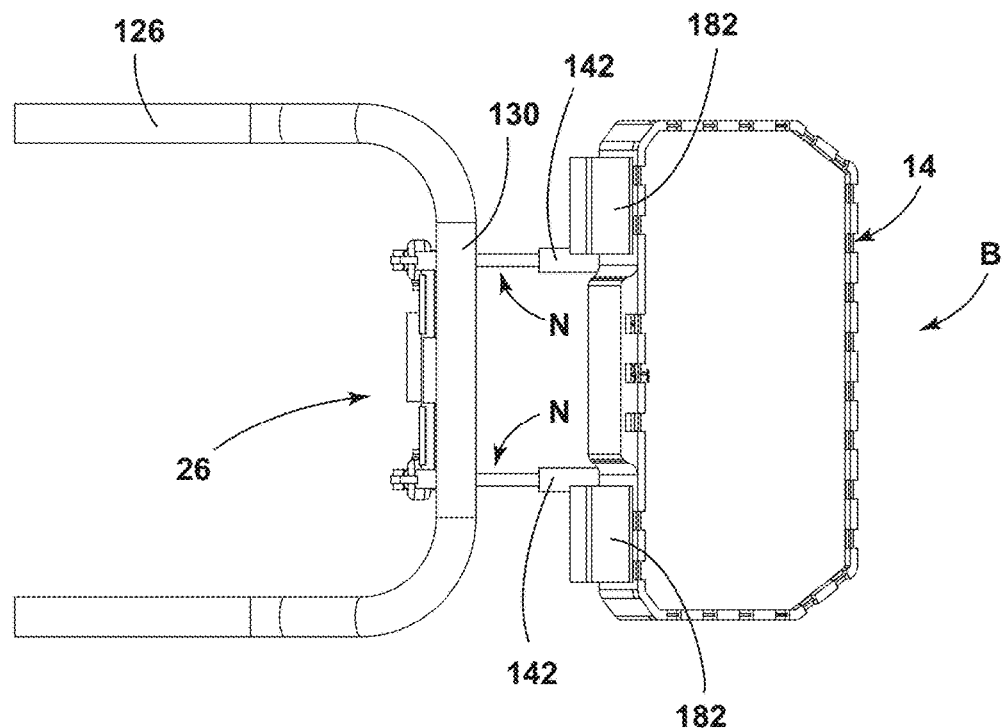
FIG. 16 is a top view of the portion of the leg support in a deployed position of FIG. 15.

Referring to FIG. 16, a top view of the leg support 14 in the deployed position B is shown. The lift mechanism 26 is shown extending between the carrier 126 and the leg support 14.

Figure 17:
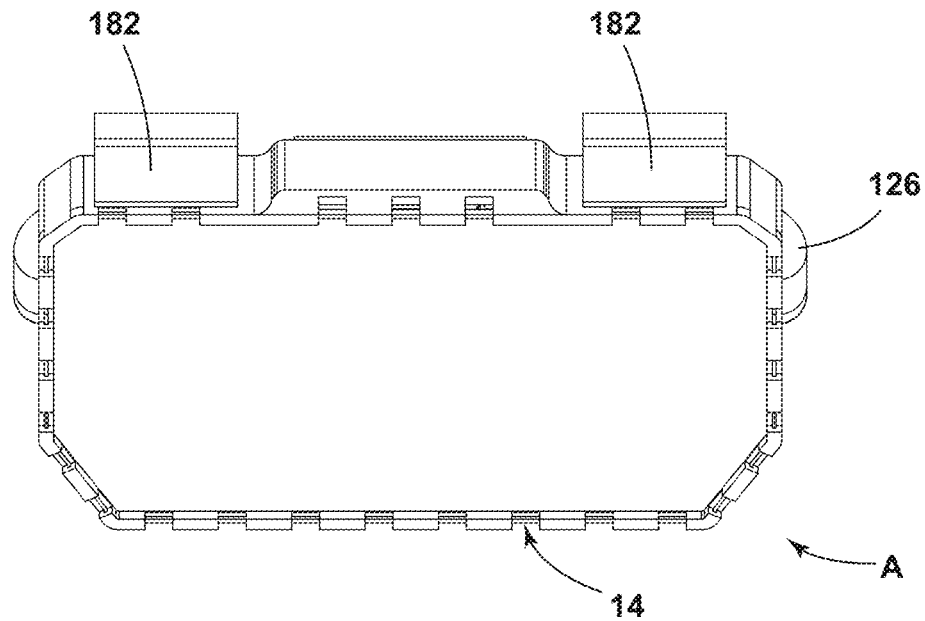
FIG. 17 is a front elevational view of a portion of the leg support in a stored position.
Figure 18:
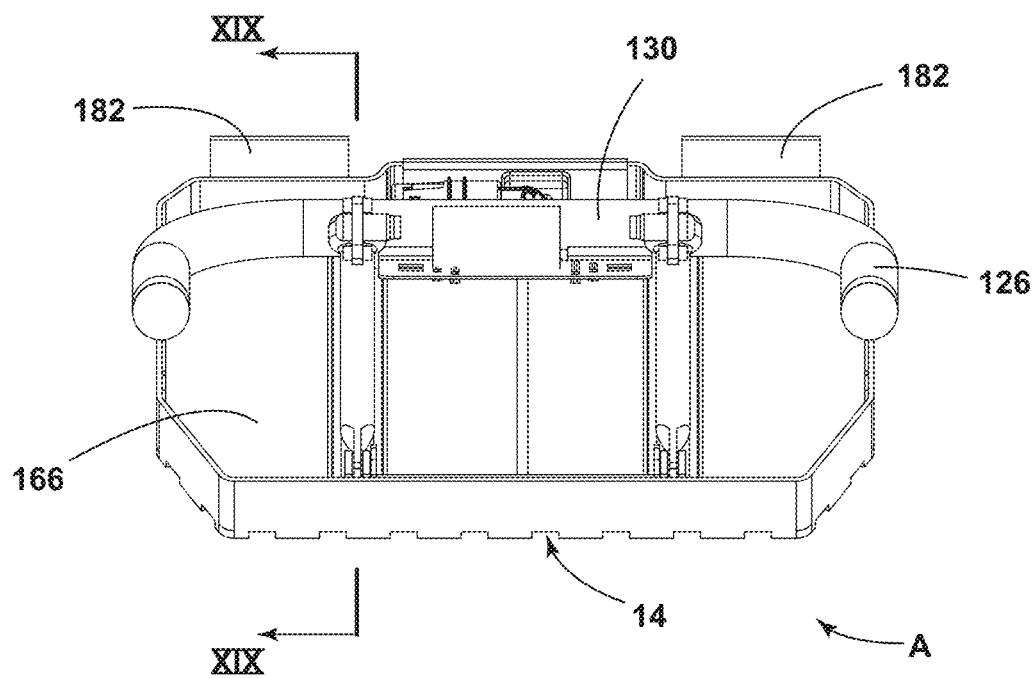
FIG. 18 is a back elevational view of the portion of the leg support in a stored position of FIG. 17.

Referring to FIG. 17, a front view of the carrier 126 and the leg support 14 in the stored position A is shown. Referring to FIG. 18, a back view of the carrier 126 and the leg support 14 in the stored position A is shown.

Figure 19:
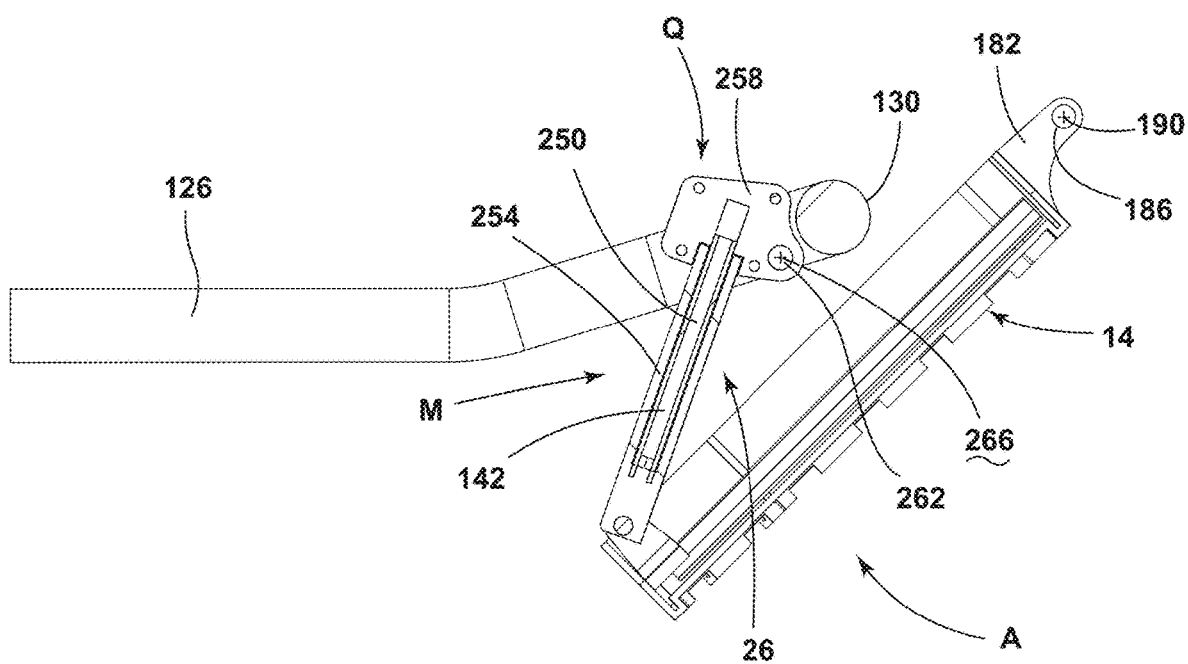
FIG. 19 is a cross-sectional view of the portion of the leg support in a stored position taken along line XIX-XIX of FIG. 18.

Referring to FIG. 19, a cross-sectional view taken along line XIX-XIX of FIG. 18 is shown. The leg support 14 is shown in the stored position A. The telescoping member 142 is shown in the retracted position M with a rod 250 disposed in the housing 254. A plate 258 supports the telescoping member 142. The plate 258 is shown in a rest position Q extending along the carrier 126. The plate 258 includes a pivot point 262. An axis 266 may be disposed through the pivot point 262. The hinge element 182 is disposed on the leg support 14. As such, while the axis 266 extending through the plate 258 and the axis 190 extending through the hinge elements 182 proximate the front of the seat pan 122 remain fixed, the lift mechanism 26 may move the leg support 14 between the stored position A of the leg support 14 and the deployed position B of the leg support 14.

Figure 20:
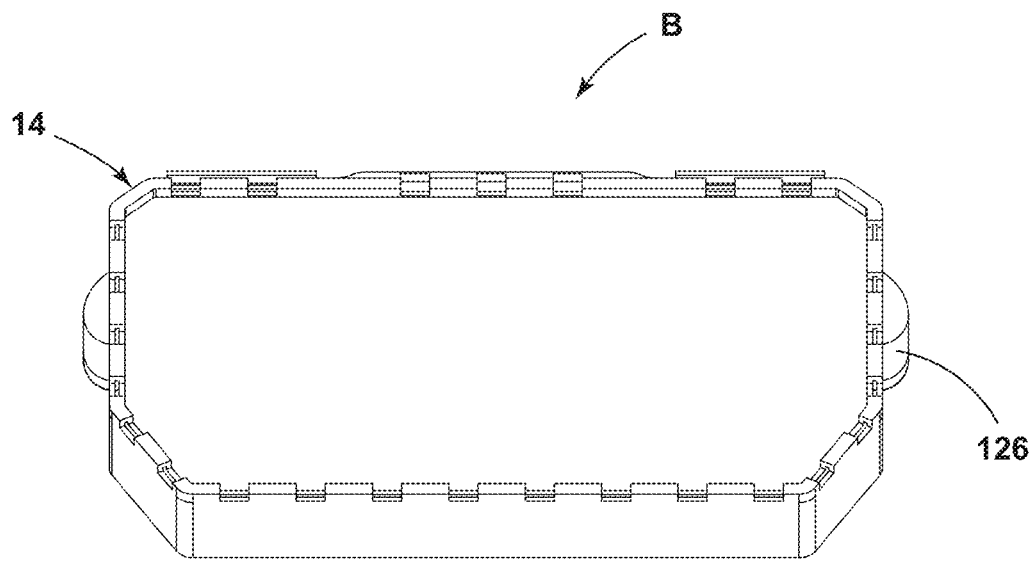
FIG. 20 is a front elevational view of a portion of the leg support in a deployed position.

Referring to FIG. 20, a front view of the carrier 126 and the leg support 14 in the deployed position B is shown.

Figure 21:
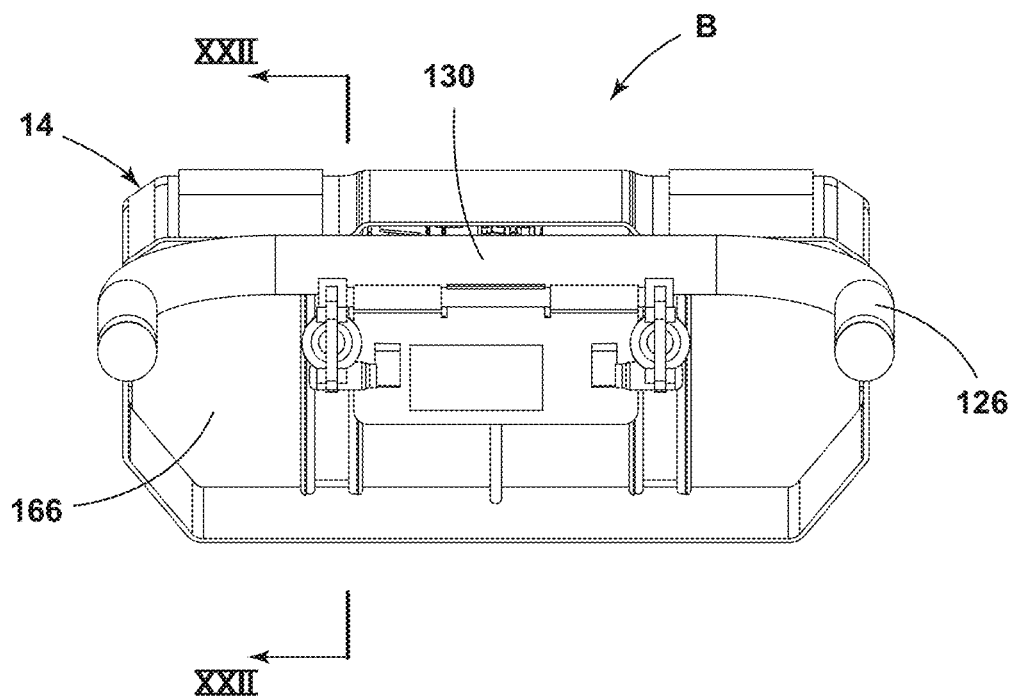
FIG. 21 is a back elevational view of the portion of the leg support in a deployed position of FIG. 20.

Referring to FIG. 21, a back view of the carrier 126 and the leg support 14 in the deployed position B is shown.

Figure 22:
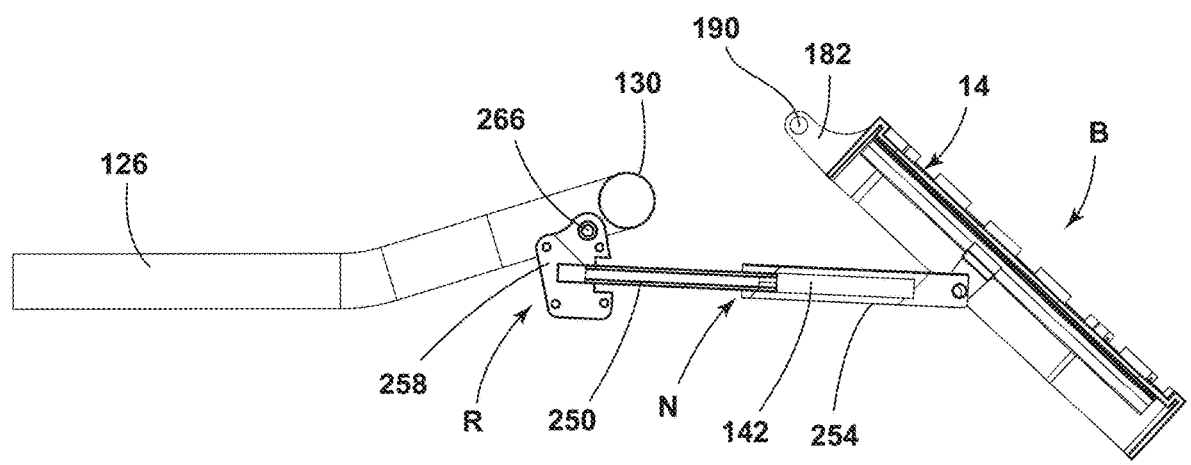
FIG. 22 is a cross-sectional view of the portion of the leg support taken along line XXII-XXII of FIG. 21.

Referring to FIG. 22, a cross-sectional view taken along line XXII-XXII of FIG. 21 is shown. The leg support 14 is shown in the deployed position B. The telescoping member 142 is shown in the extended position N with the housing 254 extending away from the rod 250. The plate 258 for supporting the telescoping member 142 is shown disposed in an activated position R extending away from the carrier 126. The plate 258 is rotated from a rest position Q disposed along the carrier 126 (FIG. 19) to an activated position R extending away from the carrier 126 (FIG. 21). As the plate 258 rotates from the rest position Q extending along the carrier 126 to the activated position R extending away from the carrier 126, the plate 258 changes the position of the telescoping member 142 from a first position extending downward and inward towards the area beneath the carrier 126 to a second position extending outward and away from the carrier 126. As such, the rotation of the plate 258 from the rest position Q (FIG. 19) to the activated position R (FIG. 22) about the axis 266 of the plate 258 may cause the leg support 14 to rotate about the axis 190 disposed through the hinge elements 182. The extension of the telescoping member 142 from the retracted position M to the extended position N may cause the additional rotation of the leg support 14 to rotate about the axis 190 disposed through the hinge elements 182.

Figure 23:
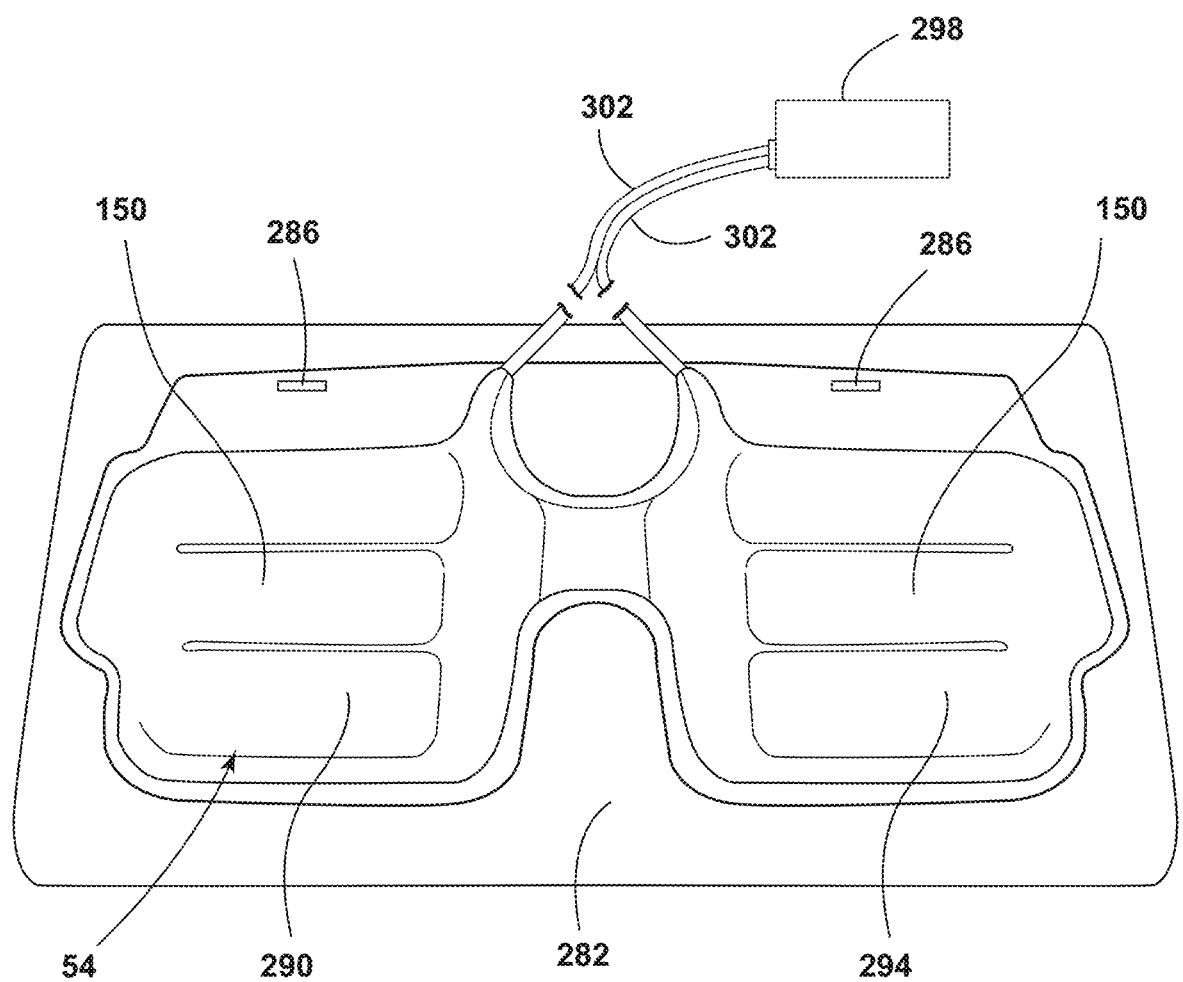
FIG. 23 is a top perspective view of a bladder for a seat.

Referring to FIG. 23, a bladder subassembly 54 that may be disposed in the seat 18 is shown. The bladder subassembly 54 may be attached to a substrate 282, such as a heavy felt. The bladder subassembly 54 may be attached to the substrate 282 with staples 286, a plastic fastener, or another attachment. The bladder assembly 22 may be disposed beneath the thigh of a passenger. The bladder assembly 22 may include a first bladder portion 290 and a second bladder portion 294. The first bladder portion 290 may be disposed below one leg of a passenger. The second bladder portion 294 may be disposed below another leg of a passenger. The first bladder portion 290 may include a bladder that may be inflatable between a deflated state E and inflated state F. The second bladder portion 294 may include a bladder that may be inflatable between a deflated state E and an inflated state F. A pump 298 may supply air to and withdraw air from the first bladder portion 290 and the second bladder portion 294. Hoses 302 may extend from the pump 298 to the first bladder portion 290 and the second bladder portion 294. The first bladder portion 290 and the second bladder portion 294 may be inflated separately or in unison to provide custom support to each leg of a passenger.

Figure 24:
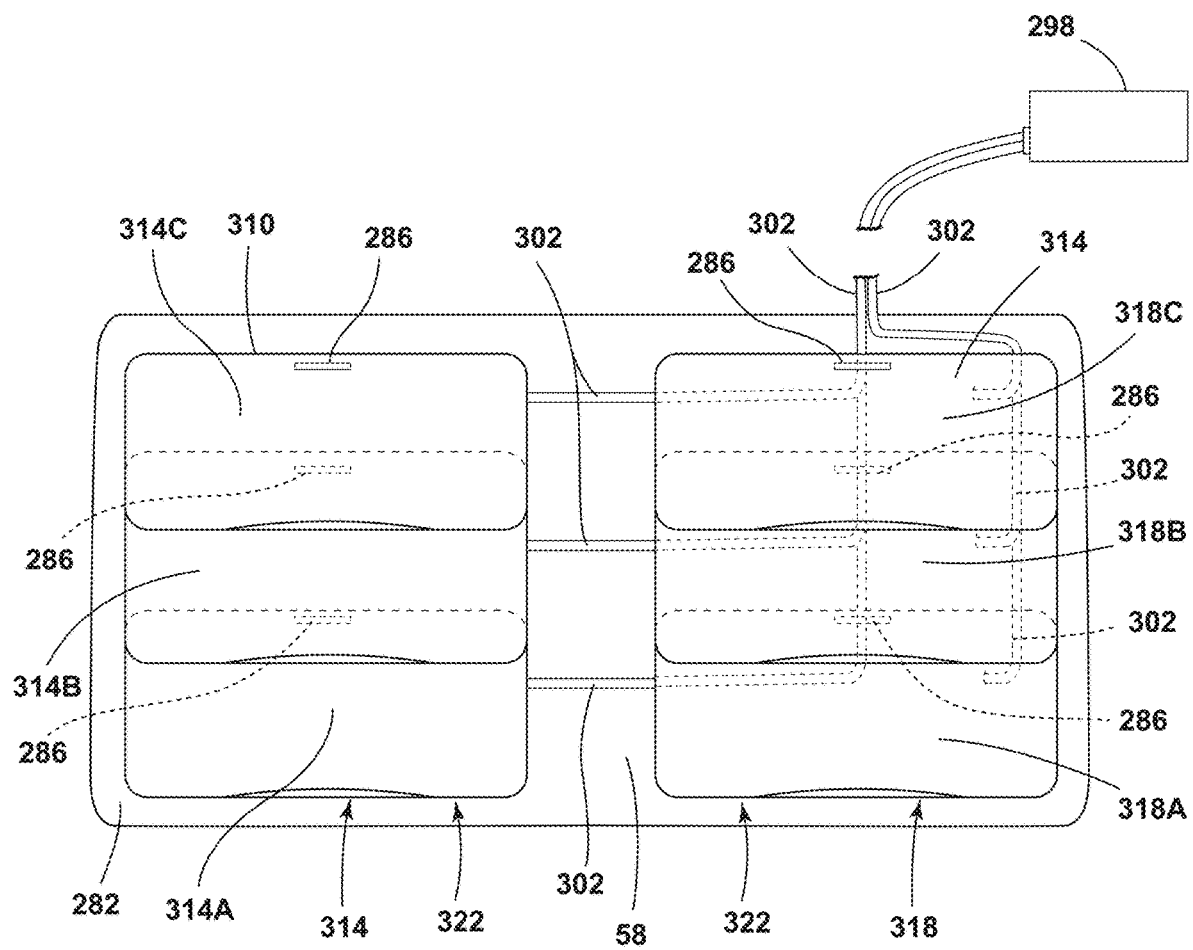
FIG. 24 is a top view of a shingled bladder for a leg support.

Referring to FIG. 24, a bladder subassembly 58 that may be disposed in the leg support 14 is shown. The bladder subassembly 58 may include a first bladder portion 314 and a second bladder portion 318. The first bladder portion 314 and the second bladder portion 318 may each be disposed under a leg of the passenger. The first bladder portion 314 and the second bladder portion 318 may each contain three bladders 314A, 314B, 314C and 318A, 318B, 318C, respectively, arranged in a shingled arrangement 322. The shingled arrangement 322 may also be described as an overlapping arrangement. In the overlapping arrangement, bladders 314A, 314B, 314C may be positioned so that bladder 314B overlaps bladder 314A while bladder 314C overlaps bladder 314B. In overlapping examples of bladders 314A, 314B, 314C, overlapping bladders 314B and 314C may have an overlap area of greater than or equal to about 1%, 5%, 10%, 20%, 30%, 40%, 50%, 60%, 70%, 80%, 90% or greater than or equal to about 99% of the bladder they are disposed over (314A and 314B, respectively). In some arrangements, bladder 314B may overlap bladder 314A, and bladder 314C may overlap both bladders 314B and 314A. The overlapping arrangement described for bladders 314A, 314B, 314C is also applicable to bladders 318A, 318B, 318C. Each of the six bladders 314A, 314B, 314C, 318A, 318B, 318C may have a separate hose 302 for connecting the bladders 314A, 314B, 314C, 318A, 318B, 318C to a pump 298. Each of the six bladders 314A, 314B, 314C, 318A, 318B, 318C may be selectively inflatable between a deflated state E and an inflated state F. The pump 298 may supply air to the bladders 314A, 314B, 314C, 318A, 318B, 318C, and the pump 298 may withdraw air from the bladders 314A, 314B, 314C, 318A, 318B, 318C. The pump 298 may be activated to inflate and deflate each of the bladders 314A, 314B, 314C, 318A, 318B, 318C with an individualized fluid amount. The pump 298 may be activated to inflate or deflate several bladders in unison. For example, bladders 314A, 314B, 314C disposed under one leg of a passenger may be inflated or deflated to achieve an amount of fluid in the bladders 314A, 314B, 314C that may be different from the amount of fluid inflated or deflated in bladders 318A, 318B, 318C. Also, the pump may be activated to inflate or deflate all of the bladders 314A, 314B, 314C, 318A, 318B, 318C with the same fluid amount. The fluid amount in a bladder (314A, 314B, 314C, 318A, 318B, 318C or a bladder portion 290 or 294) determines the contour of the bladder 314A, 314B, 314C, 318A, 318B, 318C or the bladder portion 290 or 294. Generally, the more fluid that is in the bladder 314A, 314B, 314C, 318A, 318B, 318C or the bladder portion 290 or 294, the more the bladder 314A, 314B, 314C, 318A, 318B, 318C or the bladder portion 290 or 294 expands.

It is contemplated that in addition to air or instead of air various other fluids may be used to inflate the bladders.

It will be understood by one having ordinary skill in the art that construction of the described concepts, and other components, is not limited to any specific material. Other exemplary embodiments of the concepts disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal.

It is also important to note that the construction and arrangement of the elements of the disclosure, as shown in the exemplary embodiments, are illustrative. Although a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connectors or other elements of the system may be varied, and the nature or numeral of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A vehicle seating assembly, comprising:
   a leg support rotationally coupled to a seat and including a bladder assembly at least partially disposed on the leg support; and
   a lift mechanism disposed between the seat and the leg support, wherein the lift mechanism is configured to move the leg support between a stored position and a deployed position, wherein the bladder assembly is inflatable between a deflated state and an inflated state, wherein the leg support includes a first edge and a second edge, wherein the first edge is rotationally coupled to the seat, wherein the second edge extends away from the seat, wherein the seat includes a carrier and a seat pan, wherein the first edge of the leg support is rotatably coupled to the seat pan, and wherein the carrier includes a U-shaped member extending away from the seat.

2. The vehicle seating assembly of claim 1, wherein the lift mechanism comprises a telescoping member.

3. The vehicle seating assembly of claim 1, wherein the leg support includes a recess for receiving a central portion of the U-shaped member when the leg support is in the stored position.

4. The vehicle seating assembly of claim 3, wherein the U-shaped member includes a first width, wherein the leg support includes a second width, and wherein the second width is greater than the first width.

5. The vehicle seating assembly of claim 4, wherein the lift mechanism includes a first base portion coupled to an underside of the seat and a second base portion coupled to an underside of the leg support.

6. The vehicle seating assembly of claim 5, further comprising:
a telescoping member disposed between the first base portion and the second base portion, wherein, in a retracted position, the telescoping member maintains the leg support in a stored position, and wherein, in an extended position, the telescoping member maintains the leg support in a deployed position.

7. The vehicle seating assembly of claim 6, wherein the telescoping member comprises a pair of telescoping members.

8. The vehicle seating assembly of claim 6, further comprising:
a bracket disposed in the lift mechanism, wherein the bracket is rotatable about a pivot point between a rest position and an activated position to rotate the telescoping member from a position beneath the carrier to a position extending away from the carrier.

9. The vehicle seating assembly of claim 1, wherein the bladder assembly includes a first bladder subassembly disposed on the seat and a second bladder subassembly disposed on the leg support, and wherein each of the first bladder subassembly and the second bladder subassembly includes at least one bladder having an interior cavity, and wherein the interior cavity is inflatable to inflate the bladder from a deflated position to an inflated position.

10. The vehicle seating assembly of claim 9, wherein the first bladder assembly includes a pair of bladders.

11. The vehicle seating assembly of claim 10, wherein the second bladder assembly includes a plurality of bladders configured in a shingled arrangement.

12. A vehicle seating assembly, comprising:
a deployable leg support positionable between a stored position, a deployed position, and intermittent positions therebetween and rotatably coupled to a seat;
a lift mechanism disposed between the seat and the deployable leg support; and
a bladder including a plurality of bladders in a shingled arrangement disposed on the deployable leg support and selectively inflatable between a deflated state and an inflated state, wherein the vehicle seating assembly is positionable between a sitting position and a standing position while the deployable leg support is in the stored position, wherein, in the stored position, the deployable leg support is angled inward under the seat and positionable against a carrier member of the seat, and wherein, in the deployed position, the leg support is angled outward and away from the seat.

13. The vehicle seating assembly of claim 12, further comprising:
a bladder disposed in the seat proximate a coupling between the seat and the deployable leg support.

14. A vehicle seating assembly, comprising:
a lift mechanism including:
a first portion including a first platform securable to a seat frame;
a second portion including a second platform securable to a leg support; and
a pair of telescoping members extending between the first platform and the second platform and selectively positionable between a retracted position and an extended position corresponding to a respective stored position and a deployed position of the leg support, wherein the vehicle seating assembly is disposed on rails slidable within a track assembly, and wherein the vehicle seating assembly is rotatable about a pivot point disposed at the front of the vehicle seating assembly between a sitting position and a standing position.

15. The vehicle seating assembly of claim 14, wherein the vehicle seating assembly, in the sitting position includes a latch assembly fastened to a striker coupled to a slidable rail.

16. The vehicle seating assembly of claim 15, further comprising:
a bladder assembly disposed at least partially on the vehicle seating assembly.

* * * * *